United States Patent
Ragozzino et al.

(10) Patent No.: US 11,074,828 B2
(45) Date of Patent: Jul. 27, 2021

(54) SONAR TARGET SIMULATOR

(71) Applicant: THE BOEING COMPANY, Chicago, IL (US)

(72) Inventors: Matthew J. Ragozzino, Costa Mesa, CA (US); Gary F. Tougas, Yorba Linda, CA (US)

(73) Assignee: THE BOEING COMPANY, Chicago, IL (US)

( * ) Notice: Subject to any disclaimer, the term of this patent is extended or adjusted under 35 U.S.C. 154(b) by 414 days.

(21) Appl. No.: 15/377,946

(22) Filed: Dec. 13, 2016

(65) Prior Publication Data

US 2018/0165983 A1 Jun. 14, 2018

(51) Int. Cl.
| | |
|---|---|
| *G09B 9/56* | (2006.01) |
| *A63F 13/65* | (2014.01) |
| *A63F 13/54* | (2014.01) |
| *G09B 9/00* | (2006.01) |
| *G01S 11/14* | (2006.01) |
| *G01S 15/00* | (2020.01) |

(52) U.S. Cl.
CPC ............ *G09B 9/56* (2013.01); *A63F 13/54* (2014.09); *A63F 13/65* (2014.09); *G01S 11/14* (2013.01); *G01S 15/00* (2013.01); *G09B 9/003* (2013.01)

(58) Field of Classification Search
CPC .......... G01S 11/14; G01S 15/00; G09B 9/56; G09B 9/003; A63F 13/65; A63F 13/54
See application file for complete search history.

(56) References Cited

U.S. PATENT DOCUMENTS

| | | | | |
|---|---|---|---|---|
| 3,555,165 A | * | 1/1971 | Ettenhofer | G01S 7/52004 434/7 |
| 3,713,081 A | * | 1/1973 | Murphree | G09B 9/56 367/1 |
| 3,829,596 A | * | 8/1974 | Murphree | G09B 9/56 434/6 |
| 3,835,234 A | * | 9/1974 | Murphree | G09B 9/56 434/6 |
| 4,198,703 A | * | 4/1980 | Huisveld, Jr. et al. | F41J 9/04 367/1 |
| 4,972,379 A | * | 11/1990 | Harris, Jr. | G01S 7/52004 367/13 |

(Continued)

*Primary Examiner* — Jack Yip
(74) *Attorney, Agent, or Firm* — Moore IP Law

(57) ABSTRACT

A sonar target simulator ("STS") for training a sonar operator is disclosed. The STS is configured to create a plurality of simulated scenarios within a gaming area having a plurality of environments. The STS includes one or more memory units storing real-world collected data, one or more processing units, and a computer-readable medium. The real-world collected data includes background signatures related to the plurality of simulated environments. The computer-readable medium has encoded thereon computer-executable instructions to cause the one or more processing units to generate a target signature from real-world collected data, generate an environmental model from the real-world data, and combine the target signature with the environmental model to create a simulated scenario, of the plurality of simulated scenarios, for use in the gaming area. In this example, the environmental model corresponds to an environment of the plurality of environments.

20 Claims, 5 Drawing Sheets

(56) References Cited

U.S. PATENT DOCUMENTS

| | | | | |
|---|---|---|---|---|
| 4,973,252 A * | 11/1990 | Krueger | G01S 7/52004 | 434/6 |
| 4,986,755 A * | 1/1991 | Johnson | G09B 9/56 | 367/1 |
| 5,377,163 A * | 12/1994 | Simpson | G01S 7/539 | 367/131 |
| 5,828,625 A * | 10/1998 | Costa | G01S 7/52004 | 367/13 |
| 5,937,078 A * | 8/1999 | Hyland | G06K 9/4609 | 382/103 |
| 5,949,738 A * | 9/1999 | Murphree | G01S 7/52004 | 367/1 |
| 6,002,914 A * | 12/1999 | Weinberg | G01S 7/52004 | 434/6 |
| 6,075,753 A * | 6/2000 | Clark | G09B 9/003 | 367/131 |
| 6,096,085 A * | 8/2000 | Sammelman | G01S 7/52004 | 703/2 |
| 6,449,215 B1 * | 9/2002 | Shell | G01S 7/6245 | 367/7 |
| 6,496,447 B1 * | 12/2002 | Gabriel | F41J 2/00 | 367/1 |
| 6,559,790 B1 | 5/2003 | Buehler et al. | | |
| 8,059,489 B1 * | 11/2011 | Lee | G01N 29/14 | 367/136 |
| 9,368,043 B1 * | 6/2016 | Wenger | G09B 9/003 | |
| 2002/0118599 A1 * | 8/2002 | Deveau | G01S 7/52004 | 367/13 |
| 2003/0013069 A1 * | 1/2003 | Lengua | G01S 7/52004 | 434/6 |
| 2004/0166478 A1 * | 8/2004 | Scoca | G09B 23/14 | 434/6 |
| 2006/0039236 A1 * | 2/2006 | Norwood | G01S 15/00 | 367/13 |
| 2006/0193202 A1 * | 8/2006 | Arvelo | G01S 3/801 | 367/13 |
| 2006/0241916 A1 * | 10/2006 | Sieracki | G10L 15/02 | 702/19 |
| 2006/0256650 A1 * | 11/2006 | Lee | H04B 17/0087 | 367/13 |
| 2007/0159922 A1 * | 7/2007 | Zimmerman | G01S 7/52003 | 367/103 |
| 2009/0076665 A1 * | 3/2009 | Hoisington | G05D 1/0044 | 701/2 |
| 2009/0157293 A1 * | 6/2009 | Cornett | G01C 21/3484 | 701/415 |
| 2009/0296527 A1 * | 12/2009 | Cuschieri | G01V 1/201 | 367/134 |
| 2013/0323686 A1 * | 12/2013 | Wenger | G09B 9/08 | 434/29 |
| 2016/0086093 A1 * | 3/2016 | Forero | H04R 3/005 | 381/92 |

* cited by examiner

SONAR TARGET SIMULATOR

BACKGROUND

1. Field

The disclosed systems and methods relate to sonar systems and, more particularly, to systems and methods for simulating a sonar device in operation.

2. Related Art

At present, it is difficult to train acoustic/sonar operators because it is difficult to electronically simulate (i.e. synthesize) the actual operating conditions of the seas for detecting and tracking vehicles (i.e., targets) within the seas. Some of these difficulties included, among other things, the problems of reproducing the background noise of the sea itself as well as the return signals which would be caused by various natural phenomena within the sea. For example, sonar targeting simulators (e.g., submarine targeting simulators) currently rely on modeled background noise data to hide a target within a simulated sea (i.e., a gaming area). A problem is that acoustic operators of these sonar targeting simulators are usually able to identify the reproduced and/or modeled (i.e., fake) background noise within the simulated training because it is generally different than the real-world background noise actually produced in the sea. Moreover, existing submarine targeting simulators utilize the modeled background noise in conjunction with a number of predetermined simulations. As such, acoustic operators who have previously utilized these submarine targeting simulators are able to memorize the locations of the simulated targets.

Specifically, current submarine target simulators provide Doppler based information by utilizing narrowband techniques to simulate targets of interest within a submarine target simulator. Unfortunately, while this approach is currently widely utilized, the resulting simulated signals are simple and typically obvious when compared against real-world data. Moreover, real-world data of target threats are typically decomposed and characterized based on narrowband components independently, and the variations are modeled with simple mathematical models. For example, the current known simulation tools that are utilized to simulate targets signatures (i.e., the acoustic signature of a given passive sonar target), background noise and interfering clutter, produce an output that has a "look and feel" of the output that is not realistic when compared to real-world data. As such, the acoustic operators can, in general, easily detect and identify the difference between a simulated scenario with these known tools and actual real-world in-water data.

Therefore, since the known submarine targeting simulators synthetically generate both the background noise and the target signature and combine those into a simulated scenario where the acoustic operators are being trained, the teaching value of these types of known submarine targeting simulator is generally diminished or even eliminated since the acoustic operators can, in general, easily detect and identify differences between the synthetic background noise and target signatures simulated in the scenario because of the differences with the actual real-world in-water data. As such, there is a need to improve the training value of these types of simulators.

SUMMARY

Disclosed is a sonar target simulator ("STS"). The STS is configured to create a plurality of simulated scenarios within a gaming area having a plurality of environments. The STS includes one or more memory units storing real-world collected data, one or more processing units, and a computer-readable medium. The real-world collected data includes background signatures related to the plurality of simulated environments. The computer-readable medium has encoded thereon computer-executable instructions to cause the one or more processing units to generate a target signature from real-world collected data, generate an environmental model from the real-world data, and combine the target signature with the environmental model to create a simulated scenario, of the plurality of target scenarios, for use in the gaming area. In this example, the environmental model corresponds to an environment of the plurality of environments.

As an example, of operation, the STS performs a method that includes generating the target signature from the real-world collected data, generating the environmental model from the real-world collected data, and combining the target signature with the environmental model to create the simulated scenario for use in the gaming area.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Disclosed is a sonar target simulator ("STS") for training a sonar operator. The STS is configured to create a plurality of simulated scenarios within a gaming area having a plurality of environments. The STS includes one or more memory units storing real-world collected data, one or more processing units, and a computer-readable medium. The real-world collected data includes background signatures related to the plurality of simulated environments. The computer-readable medium has encoded thereon computer-executable instructions to cause the one or more processing units to generate a target signature from real-world collected data, generate an environmental model from the real-world data, and combine the target signature with the environmental model to create a simulated scenario, of the plurality of target scenarios, for use in the gaming area. In this example, the environmental model corresponds to an environment of the plurality of environments.

As an example, of operation, the STS performs a method that includes generating the target signature from the real-world collected data, generating the environmental model from the real-world collected data, and combining the target signature with the environmental model to create the simulated scenario for use in the gaming area.

Figure 1:
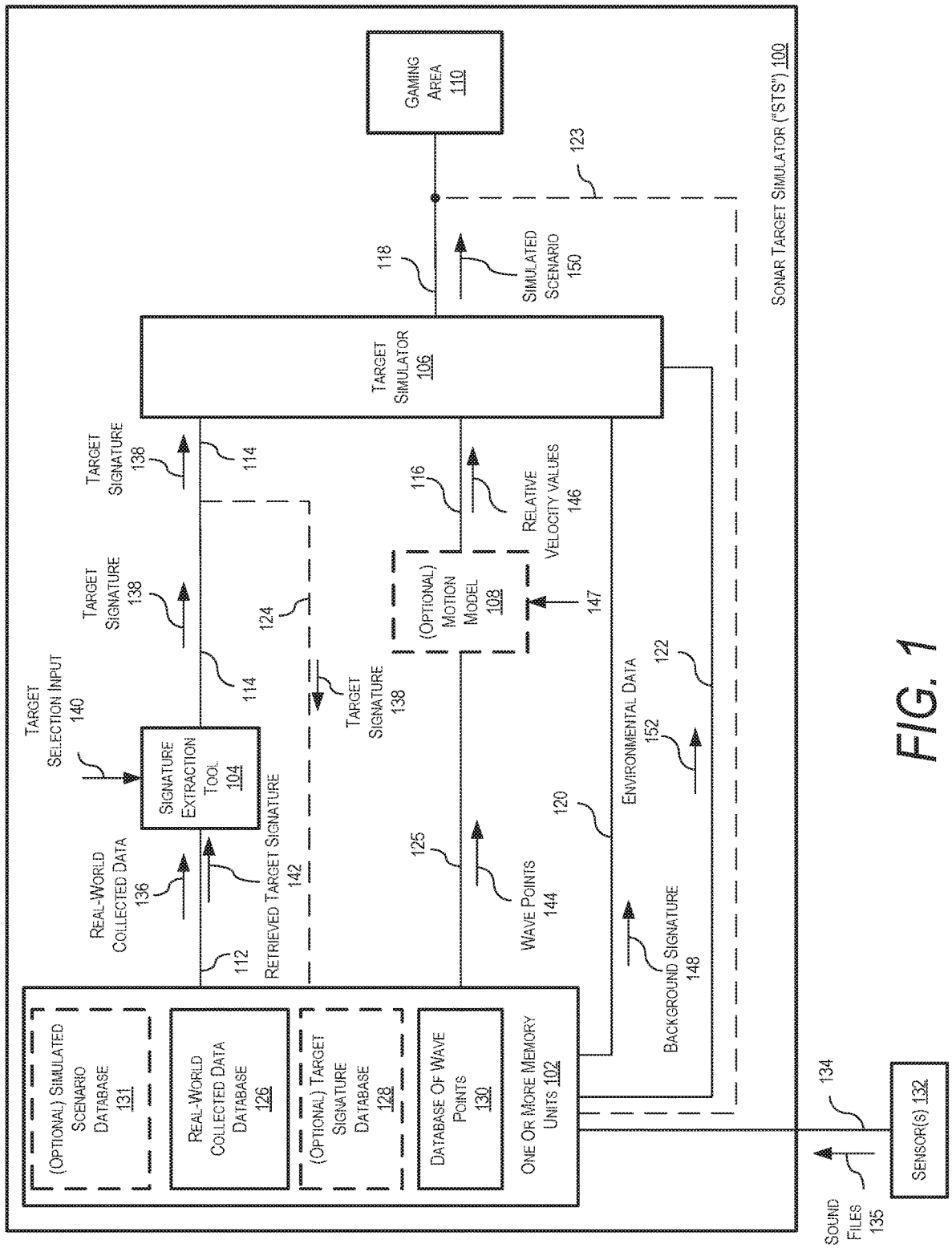
FIG. 1 is a system block diagram of an example of an implementation of a sonar target simulator ("STS") in accordance with the present disclosure.

In FIG. 1, a system block diagram of an example of an implementation of STS 100 is shown in accordance with the present disclosure. In this example, the STS 100 includes one or more memory units 102, a signature extraction tool 104, and a target simulator 106. The STS 100 may also include an optional motion model 108 and gaming area 110. In this example, the signature extraction tool 104 is in signal communication with both the one or more memory units 102 and the target simulator 106 via signal paths 112 and 114, respectively. Additionally, the target simulator 106 is also in signal communication with the optional motion model 108, gaming area 110, and one or more memory units 102 via signal paths 116, 118, 120, 122, and optional signal path 123, respectively. Moreover, in this example, the signature extraction tool 104 may also be optionally in signal communication with the one or more memory units 102 via signal path 124. Furthermore, the optional motion model 108 may be in signal communication with the one or more memory units 102 via signal path 125.

In this example, the one or more memory units 102 may include a real-world collected database 126, an optional target signature database 128, a database of wave points 130, and an optional simulated scenario database 131. For example, the one or more memory units 102 may be a single memory unit storing the real-world collected database 126, optional target signature database 128, database of wave points 130, and an optional simulated scenario database 131 or a plurality of memory units where a first memory unit may storage the real-world collected database 126, a second memory unit may store the optional target signature database 128, a third memory unit may store the database of wave points 130, and a fourth memory unit may store the optional simulated scenario database 131. In this example, the one or more memory units 102 may also be in signal communication with one or more sensors 132 via signal path 134.

The real-world collected data in in the real-world collected data database 126 includes real-world collected data of the recorded sounds of the sea that mostly includes background noise of the sea (including, for example, environmental noise and marine life) and occasionally sounds of vehicles traveling through the sea within range of the recording sensors such as, for example, surface ships or submerged vehicles such as submarines. In general, most of the real-world collected data will be recorded sound files of background noise that may be characterized as a background acoustic signature (generally simply referred to as a "background signature") that may include ambient noise levels produced by the waves, winds, rain, underwater geothermal activities, magma displacement, marine life, depths of the thermocline, reflections from different underwater landmasses or topologies, etc. Additionally, some of the real-world collected data will include narrowband and broadband noise produced by surface ship (such as, for example, passenger, merchant, or military ships) or submarines. This narrowband and broadband noise is "self-produced" noise that is produced and emitted from the surface ship or submarine. In general, broadband noise is produced by the propulsion machinery of a surface ship or submarine and may include noise produced by propellers, flow noise of the hull passing through the water, external fittings, etc. Additionally, narrowband noise is also generally produced by the propulsion system of the surface ship or submarine and the physical effects of cavitation close to the propeller blades. The combination of the narrowband and broadband noise produced by a surface ship or submarine is defined as the acoustic signature of the surface ship or submarine. In this disclosure, the acoustic signatures of any surface ship or submarine of interest for the sonar operator will be generally referred to as a "target signature" since the surface ship or submarine is a "target" to be identified, tracked, and possibly attacked in the simulated scenario produced by the STS 100.

In general, the real-world collected data is a collection of sound files 135 that have been previously recorded by either the one or more sensors 132 in signal communication with the STS 100 or one or more sensors from other surface ships, submarines, or aircraft such as, for example, towed arrays of hydrophones towed underwater in the sea behind other surface ships or submarines, cylindrical hydrophone arrays, flank arrays, or sonobuoys dropped by aircraft into the sea. In this disclosure, the previously recorded sound files of the real-world collected data may include any high fidelity acoustic data files having any digital format that may include, for example, WAV, AIFF, AU, PCM, MP3, FLAC, WavPack, TTA, ATRAC, ALAC, MPEG-4, WMA, WMA, WMA lossless, Opus, Vorbis, AAC, proprietary encodings, etc.

As an example, the one or more sensors 132 may be sensors that utilize a beamforming process in which outputs from the hydrophone sensors of a hydrophone array of the one or more sensors 132 are coherently combined by delaying and summing the outputs to provide enhanced detection and estimation. In underwater applications, sonar operators are trying to detect a target signature of a target that is a directional (i.e., single direction) signal in the presence of normalized background noise that is ideally isotropic (i.e., not directional). By arranging the hydrophone array of the one or more sensors 132 in different physical geometries and electronically steering them in a particular direction, the sonar operator can increase the signal-to-noise ("SNR") in a given direction by rejecting or canceling the noise in other directions. It is appreciated by those of ordinary skill in the art that there are many different kinds of arrays that may be beamformed such as, for example, an equally spaced line, continuous line, circular, cylindrical, spherical, or random sonobouy arrays. In general, the beam pattern specifies the response of these arrays to the variation in direction. In the simplest case, an increase in SNR due to the beamformer is called the array gain.

It is appreciated by those of ordinary skill in the art that the circuits, components, modules, and/or devices of, or associated with, the STS 100 are described as being in signal communication with each other, where signal communication refers to any type of communication and/or connection between the circuits, components, modules, and/or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass from one circuit, component, module, and/or device to another and includes wireless or wired signal paths. The signal paths may be physical, such as, for example, conductive wires, electromagnetic wave guides, cables, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying digital formats without passing through a direct electromagnetic connection.

In an example of operation, the signature extraction tool 104 receives the real-world collected data 136 from the real-world collected database 126 via signal path 112. The signature extraction tool 104 then extracts a target signature 138 from the real-world collected data 136 and sends it to the target simulator 106 via signal path 114. In this example, the signature extraction tool 104 may include threshold modules and/or software that automatically recognizes and selects a target signature from the real-world collected data 136 to generate the target signature 138 or the signature extraction tool 104 may include logic and a user communication interface that allows a trainer (i.e., a person setting up the simulated scenario to train other sonar operators) to review the real-world collected data 136 and manually select (via a target selection input 140) the target signature 138 from the reviewed real-world collected data 136. It is appreciated by those of ordinary skill in the art that the trainer may review the real-world collected data 136 utilizing a low frequency analysis and ranging record gram ("LOFARGRAM") plot of time versus frequency. The trainer may then detect and cut out small portions (i.e., a snippet of the real-world collected data) of the audio files of the real-world collected data 136 that correspond to targets of interest to the trainer. As such, in this example, the target signature 138 is a snippet of the real-world collected data 136 that contains the acoustic signature of a target (i.e., the target signature 138). The acoustic data corresponding to the target signature is typically very small compared to the acoustic data corresponding to background noise of the oceans. As an example, the acoustic data corresponding to the target signature (i.e., the snippet of the target signature 138) may be 20 seconds to 2 minutes long in length, while the real-world collected data in the real-world collected data base 126 may include acoustic background data that may be hundreds of hours or longer.

If the optional target signature database 128 is present, the signature extraction tool 104 may also send a copy of the target signature 138 to the optional target signature database 128 for storage for future retrieval by the signature extraction tool 104 via optional signal path 124. In this example, in another simulated scenario, the signature extraction tool 104 may instead receive a retrieved target signature 142 from the optional target signature database 128 and send it as the new target signature 138 to the target simulator 106 via signal path 114 without having the signature extraction tool 104 modify the received target signature 142. In this example, the signature extraction tool 104 may include logic having hardware and/or software that automatically selects a retrieved target signature 142 from the optional target signature database 128 to generate the target signature 138 or the signature extraction tool 104 may include logic and a user communication interface that allows the trainer to review the stored target signatures in the optional target signature database 128 and manually select (again via the target selection input 140) a retrieved target signature 142 from the optional target signature database 128 that will be sent to the target simulator 106 (via signal path 114) as the target signature 138. In this example, the optional target signature database 128 may be a database of selected snippets of the real-world collected data 136, where the selected snippets correspond to the selected target signatures within the real-world collected data 136.

In this example, the optional motion model 108 is a device, component, module, (which may be either hardware, software, or both) capable of receiving a plurality of received wave points 144 and, in response, produced a signal of relative velocity values 146 (also referred to as positional target track values). It is appreciated by those of ordinary skill in the art that, generally, passive sonar relies on Doppler and bearing information. The optional motion model 108 then performs a target motion analysis on the bearing tracks to estimate parameters of bearing and relative velocity of the target signature 138. In other words, in this example, the output (i.e., relative velocity values 146) of the motion model 108 is feed to the target simulator 106, and within the target simulator 106, observed Doppler and bearing information are derived between all possible pairs of target and receivers tracks (i.e., sensors 132).

As such, the optional motion model 108 may optionally include a database of wave points or be in signal communication with the database of wave points 130 (located at the one or more memory units 102), where the wave points 144 represent a series of positional points over a course of time for different assets that include the target that produced the target signature 138 and the position of the one or more sensors 132 relative to the movement of the target. In general, the database of wave points 130 may include wave point values from one to three sub-databases of data representing the three-dimensional (e.g., the x, y, and z Cartesian) coordinates of a target over time, the corresponding three-dimensional (e.g., the x, y, and z Cartesian) coordinates of the one or more sensors 132, and the resulting relative velocity of the target over time in relation to the one or more sensors 132. Typically, these sub-databases would represent three-dimensional matrices where the optional motion model 108 is configured to calculate a matrix of relative velocity values from the matrix of the three-dimensional values of the change in position of the moving target versus time and the matrix of the three-dimensional values of the change in position of the moving one or more sensors 132 versus time. In general, it is appreciated by those of ordinary skill in the art that the matrix of relative velocity values are Doppler corrected values that are calculated to compensate for the Doppler shift of the observer (i.e., the one or more sensors 132) moving relative to the source (i.e., the target). In addition, it is also appreciated that a fourth matrix may also be included in the Doppler correction where the fourth matrix represents the three-dimensional values of the change in position of the medium in which the target and one or more sensors 132 are present. For example, the medium in the Ocean seas is moving salt water that may need to be taken into account in the calculation to produce the matrix of relative velocity values.

In this example, the reason that the motional model 108 is optional is because the optional database of wave points may include either sub-database of the "raw" positional values of the matrix of the three-dimensional values of the change in position of the moving target versus time, the sub-database of the raw positional values of the matrix of the three-dimensional values of the change in position of the moving one or more sensors 132 versus time, and the sub-database of the raw positional values of the matrix of the three-dimensional values of the change in position of the moving medium versus time or a database (or sub-database) of the matrix of relative velocity values, or both. As an example, if the database of wave points 130 includes the matrix of relative velocity values, the STS 100 does not need the motion model 108 since the database of the matrix of relative velocity values in the database of wave points 130 already has the relative velocity values 146 that may simply be retrieved by the target simulator 106 without having to perform any calculations with the motion model 108.

Alternatively, as an example if the optional motion model 108 is present, based on the simulated scenario to be produced by the STS 100, the optional motion model 108 would produce the plurality of relative velocity values 146 that are sent to the target simulator 106 via signal path 116. The number of relative velocity values 146 would be based on how many wave point 144 inputs (from the sub-databases of the matrices of the raw positional values of the moving target, one or more sensors 132, and medium) were received by the optional motion model 108 via signal path 125. As an example, if the optional motion model 108 receives five (5) wave points 144, which were created from five (5) unique sound files 135 produced with five (5) of the sensors 132 (or other sensors from other sonar systems on a different ship, submarine, or aircraft that have been previously recorded and stored in the database of wave points 130), the resulting wave points 144 would include five (5) perceived target signatures of the target (that created the target signature 138) going through the gaming area 110. Generally, the optional motion model 108 may include nonlinear filtering methods that include, for example, Kalman-Bucy filters and a state space model for the motion of the target signature 138. Additionally, in this example, the optional motion model 108 may include sub-modules that allow a user (e.g., a trainer) to define waypoints and a scenario clock. The waypoints is herein defined parameter values that include, for example, starting positions, velocities, depth/altitude, rate of turn, acceleration, or combination of these parameters and the scenario clock includes, for example, a duration of the scenario and a sampling rate. Based on the "scenario clock" and waypoints, the output of the motion model 108 (i.e., the relative velocity values) will be time, position, velocity, and optionally acceleration all of which are functions of time.

In general, these receiver (i.e., the one or more sensors 132) and target positions and velocities (i.e., the wave points 144) may be input into a target motion analysis ("TMA") module (not shown) within the optional motion model 108 that estimates the relative velocity (alternatively radial velocity) and relative bearing of the target signature 138 to a given sensor 132. In this example, the database of wave points 130 may be optionally located either in the one or more memory units 102, within the optional motion model 108, or in another storage device (i.e., memory) in signal communication with the optional motion model 108.

The optional motion model 108 may also include a user input 147 that allows the trainer to select the type of position and motion of the target signature 138. As an example, if the originally recorded target signature 138 was traveling from north-to-south, the trainer may select that the target signature 138 be modified to travel from east-to-west for the simulated scenario 150 via the user input 147.

The target simulator 106 receives the target signature 138, positional relative velocity values 146, and a background signature 148 from the signature extraction tool 104, the optional motion model 108, and one or more memory units 102 via signal paths 114, 116, and 120, respectively. In response, the target simulator 106 combines the target signature 138, relative velocity values 146, and a background signature 148 and produces a simulated scenario 150 that is passed to the gaming area 110 via signal path 118. The simulated scenario 150 is a created virtual environment that is generated by the target simulator 106 to be displayed and interacted with within the gaming area 110. Utilizing the simulated scenario 150, a sonar operator may be trained in detecting, identifying, and tracking different targets (such as, for example, enemy ships or submarines) in the simulated scenario 150 within the gaming area 110. The target simulator 106 may also receive optional environmental data 152 from the one or more memory units 102 (via signal path 122) so as to modify the environmental conditions of the simulated scenario 150. In this example, the gaming area 110 is a created digital virtual environment or "world" having defined gaming parameters such as, for example, simulation time, extend of virtual area covered by the simulation, input and output interfaces that allow a sonar operator (shown in FIG. 3) to interact (i.e., "playing a game" within the created virtual environment) with the simulated scenario where the simulated scenario is a simulated scenario since.

In addition to allowing a sonar operator to interact with the STS 100 via the gaming area 110, the STS 100 may also send the simulated scenarios 150 to the optional simulated scenario database 131 via optional signal path 123. In this example, the simulated scenario database 131 is a historical simulated scenario database of historical simulated scenarios. In this example, the STS 100 may utilize the previously recorded simulated scenarios in the future to run standalone scenarios later or maintenance. As an example, a standalone scenario may be a scenario run by the STS 100 at port (where the ship is not moving and as a result the sensors 132 are not being utilized) or at a land-based area where the STS 100 is part of a land-based simulator that lacks actual sensors 132. In this example, the simulated scenario 150 data would include data that is passed to the gaming area 110, which may include, for example, recorded values for the outputs of whatever number of sensors 132 are being simulated in a given simulated scenario, optional truth data that would include the actual position over time of the simulated target or targets, parameters related to the simulated scenario, and optional meta-data related to describing the target, description, title, etc.

As an example, the STS 100 allows sonar operators to be trained in detecting different types of target signatures 138 utilizing their own sonar systems, where the sonar systems collect sound files 135 of real-world collected data with their one or more sensors 132, store them into the real-world collected data database 126 and superimpose target signatures 138 on to the background signatures 148 in the real-would collect data 136. The target signatures 138 may be obtained by the sonar system or by other external sonar systems that have been previously recorded and stored in the STS 100. As an example, trainers may observe the real-world collected data 136 and make snippets of the real-world collected data 136 that contain target signatures 138 that may be optionally stored in the optional target signature database 128 for later use in simulated scenarios 150. Alternatively, the optional target signature database 128 may include snippet recordings of target signatures 138 that were previously recorded by other sonars that are independent of the sonar of the user (e.g., target signatures recorded by other submarines, ships, or aircraft on different maritime patrols). The target signatures 138 may be a high fidelity as the sonar system (or systems) are capable of providing. The trainers may then select a specific target signature 138, an associated position and target motion for the target signature 138, and an environmental model for the simulated scenario 150. The target simulator 106 then superimposes the modified target signature 138 to the background signature 148 to create a variety of different simulated scenarios 150 that may be simulated in the gaming area 110. As such, the STS 100 allows the target signatures 138 to be recycled for training the sonar operators because a first target signature that was originally recorded in one place such as, for example, the Mediterranean sea traveling north-to-south, may be modified to become a modified first target signature traveling east-to-west in the sea of Japan having different environmental spreading and dynamics.

Figure 2:
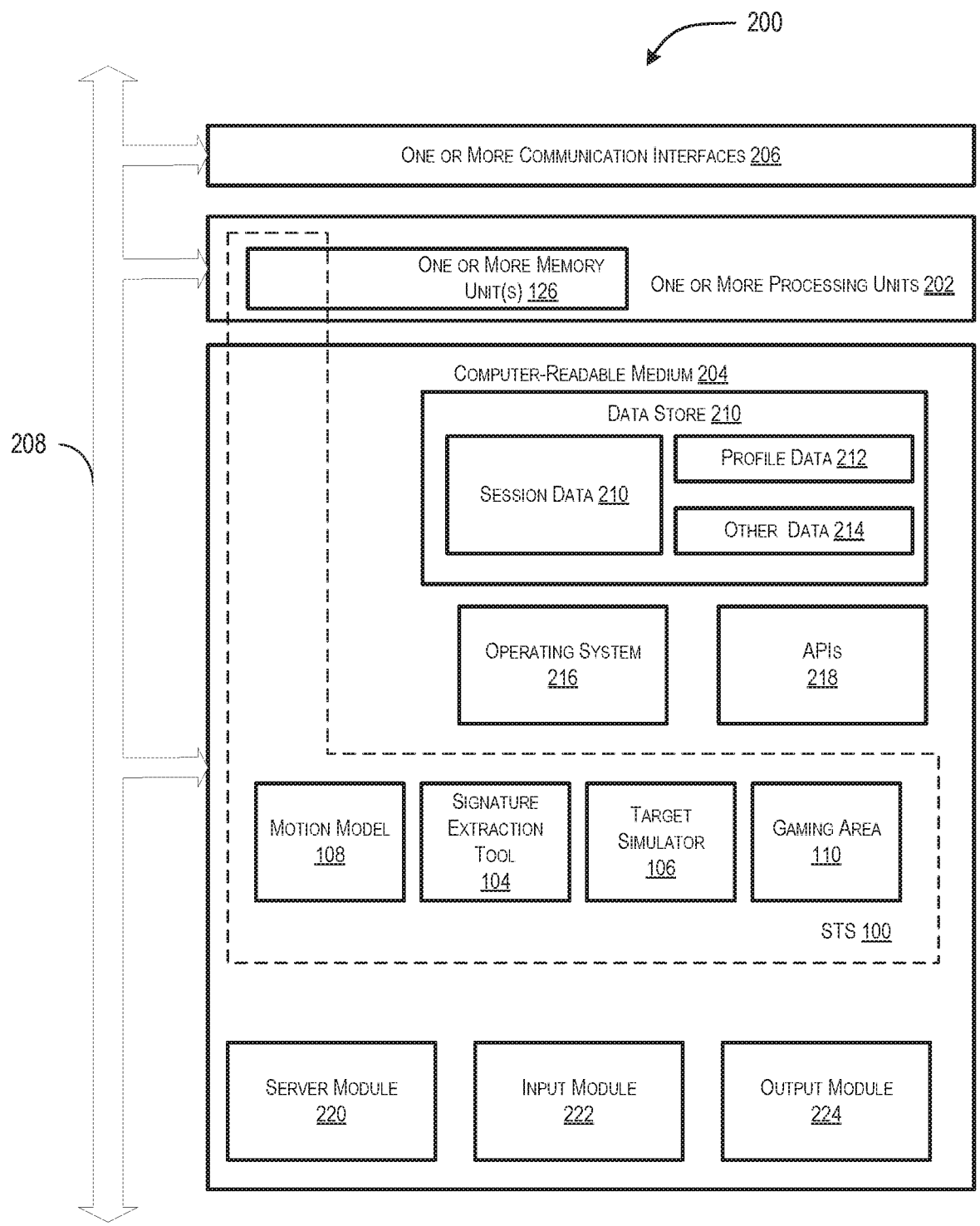
FIG. 2 is a system block diagram of an example of an implementation of the STS, shown in FIG. 1, within a computing device in accordance with the present disclosure.

In FIG. 2, a system block diagram of an example of an implementation of the STS 100 within a computing device 200 is shown in accordance with the present disclosure. In this example, the computing device 200 includes one or more processors 202, the one or more memories 126, a computer-readable/storage medium 204, and one or more communications interfaces 206. In this example, the one or more processing units 202, one or more memory units 126, computer-readable medium 204, and one or more communication interfaces 206 are in signal communication and operatively connected with each other via a bus signal path 208, which may include one or more of a system bus, a data bus, an address bus, a Peripheral Component Interconnect ("PCI") bus, a Mini-PCI bus, and any variety of local, peripheral, and/or independent buses. The computer-readable medium 204 includes encoded thereon computer-executable instructions that cause the one or more processors 202 to generate a target signature 138 from the real-world collected data 136, generate an environmental model from the real-world collected data 136 and optional environmental data 152, and combine the target signature 138 with the environmental model to create a simulated scenario 150 for use in the gaming area 110. In this example, the STS 100 may include the one or more memory units 126 from the one or more processing units 202 and the signature extraction tool 104, target simulator 106, optional motion model 108, and gaming area 110 of the computer-readable medium 204.

As utilized herein, the one or more processing units 202 may represent, for example, a central processing unit ("CPU")-type processing unit, a graphics processing unit ("GPU")-type processing unit, a field-programmable gate array ("FPGA"), another class of digital signal processor ("DSP"), or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable medium 204 may store instructions executable by the one or more processing units 202. The computer-readable medium 204 may also store instructions executable by external processing units (not shown) such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in the computing device 200, while in some examples one or more of a CPU, GPU, and/or accelerator is external to a computing device 200.

The computer-readable medium 204 may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random-access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to the computer storage medium 204, communication media may embody computer-readable instructions, data structures, program modules, or other data in a modulated data signal, such as a carrier wave, or other transmission mechanism. As defined herein, computer storage medium 204 does not include communication media. That is, computer storage media does not include communications media consisting solely of a modulated data signal, a carrier wave, or a propagated signal, per se.

The one or more communication interfaces 206 may represent, for example, network interface controllers ("NICs") or other types of transceiver devices to send and receive communications over a network.

In this example, the computer-readable medium 204 includes a data store 210. In some examples, the data store 210 may include data storage such as a database, data warehouse, or other type of structured or unstructured data storage for operation of computing device 200 and STS 100. In some examples, the data store 210 may include a corpus and/or a relational database with one or more tables, indices, stored procedures, and so forth to enable data access of the STS 100 by a user including, for example, one or more of hypertext markup language ("HTML") tables, resource description framework ("RDF") tables, web ontology language ("OWL") tables, and/or extensible markup language ("XML") tables.

The data store 210 may store data for the operations of processes, applications, components, and/or modules stored in computer-readable medium 204 (such as the STS 100) and/or executed by the one or more processing units 202 and/or accelerator(s). As an example, the data store 210 may store session data 212, profile data 214, and/or other data 215. The session data 212 may include data relating to the training sessions performed by the STS 100, and activity that occurred in the training session and/or other data related to when and how the training session where conducted or hosted by the STS 100. Examples of profile data 214 include, but are not limited to, an identity ("ID") and other data of the sonar operator being trained.

Alternately, some or all of the above-referenced data may be stored on the separate one or more memory units 126 on board the one or more processing units 202 such as, for example, a memory on board a CPU-type processor, a GPU-type processor, an FPGA-type accelerator, a DSP-type accelerator, and/or another accelerator. In this example, the computer-readable medium 204 also includes an operating system 216 and application programming interfaces ("APIs") 218 configured to expose the functionality and the data of the STS 100 to external devices associated with the computing device 200 via the one or more communication interfaces 206. Additionally, the computer-readable medium 204 may include one or more modules such as the server module 220, input module 222, and output module 224, although the number of illustrated modules is just an example, and the number may vary higher or lower. That is, the functionality described in this disclosure in association with the illustrated modules in the computing device 200 may be performed by a fewer number of modules or a larger number of modules on one device or spread across multiple devices. In this example, the output module 224 may be in signal communication with one or more output devices (such as, for example, one or more displays and sound speakers) that allow the sonar operator to see and hear data related to the simulated scenario 150 within the gaming area 110. Similarly, the input module 222 may be in signal communication with one or more input devices (such as, for example, a keyboard, mouse, general pointing device, or touch screen) that allow the sonar operator to respond and input commands to the computing device 200.

Figure 3:
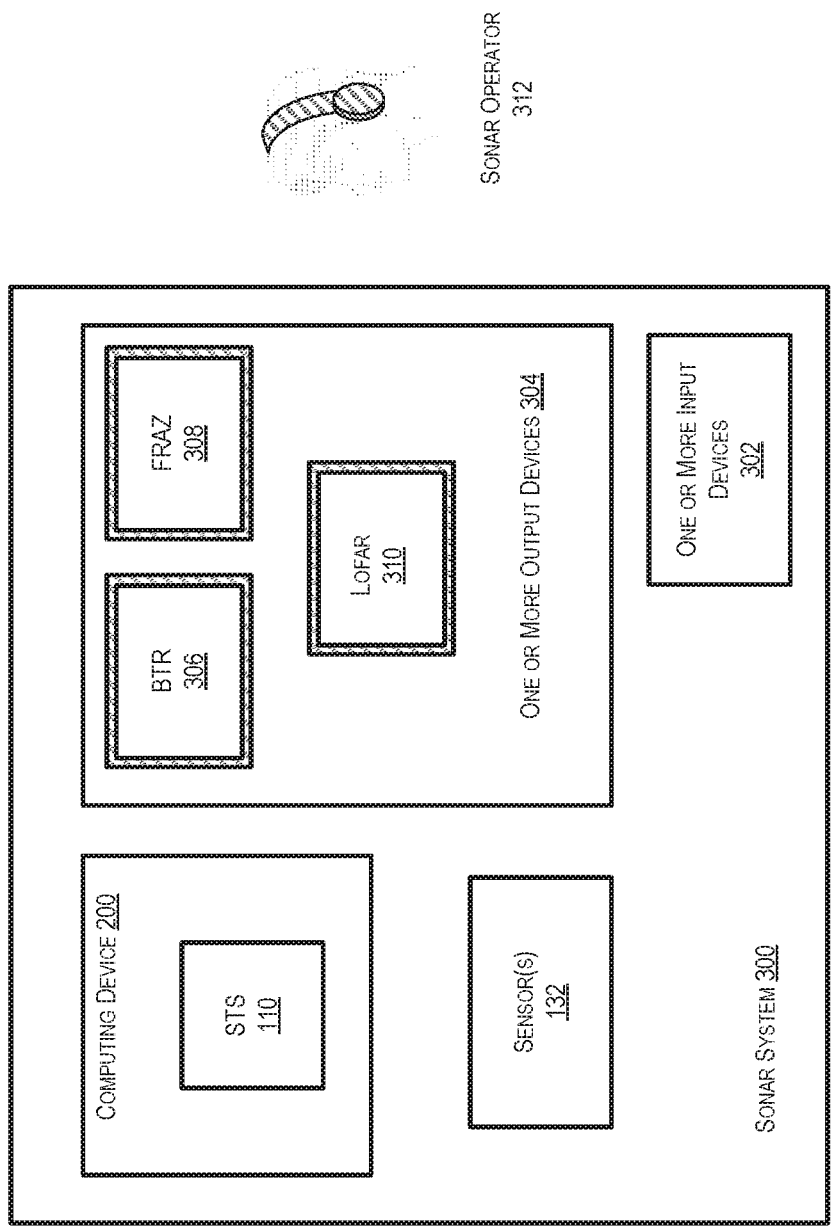
FIG. 3 is a system diagram of an example of an implementation of a sonar system including the STS, shown in FIGS. 1 and 2, in accordance with the present disclosure.

Turning to FIG. 3, a system diagram of an example of an implementation of a sonar system 300 including the STS 100 is shown in accordance with the present disclosure. The sonar system 300 may also include the one or more sensors 132, the computing device 200, one or more input devices 302 (in signal communication with the input module 222), and one or more output devices 304 (in signal commination with the output module 224). In this example, a first display 306, second display 308, and third display 310 are shown to provide information to a sonar operator 312 that is being trained on the sonar system 300. In general, for passive sonar systems, the three main parameters of interest are time, frequency, and bearing. Since three-dimensional data is usually difficult to visualize and analyze, it is usually displayed in three types of formats—bearing time, bearing frequency, and time frequency. The bearing time is obtained by integrating over frequency, which is useful for target signatures with significant broadband characteristics. The bearing time is displayed as a bearing time recorder ("BTR") plot of time versus bearing (i.e., the horizontal angle). The bearing frequency is obtained at particular intervals of time, which is effective for target signatures with strong stable spectral lines. The time frequency is displayed as a frequency azimuth ("FRAZ") plot of frequency versus bearing. The time frequency is obtained by recording the narrow beam spectrum of the target signature in a given beam as a function of time. In this example, the first display 306 may be a BTR display, the second display 308 may be FRAZ display, and the third display 310 may be a LOFARGRAM (also known as "LOFAR" gram) display. It is appreciated that the one or more output devices 304 may also include other types of displays but in general for passive sonars (or training on passive and non-active use of a sonar that is both passive and active), sonar operators 312 will only need the output information from BTR, FRAZ, and LOFARGRAM displays to make an informed decision as to whether a target signature has been detected and, then start the process of classifying the detected target signature. In general, the combination of the one or more output devices 304 and one or more input devices 302 allow the sonar operator 312 to interact with the simulated scenario within the gaming area 110 of the STS 100.

Figure 4:
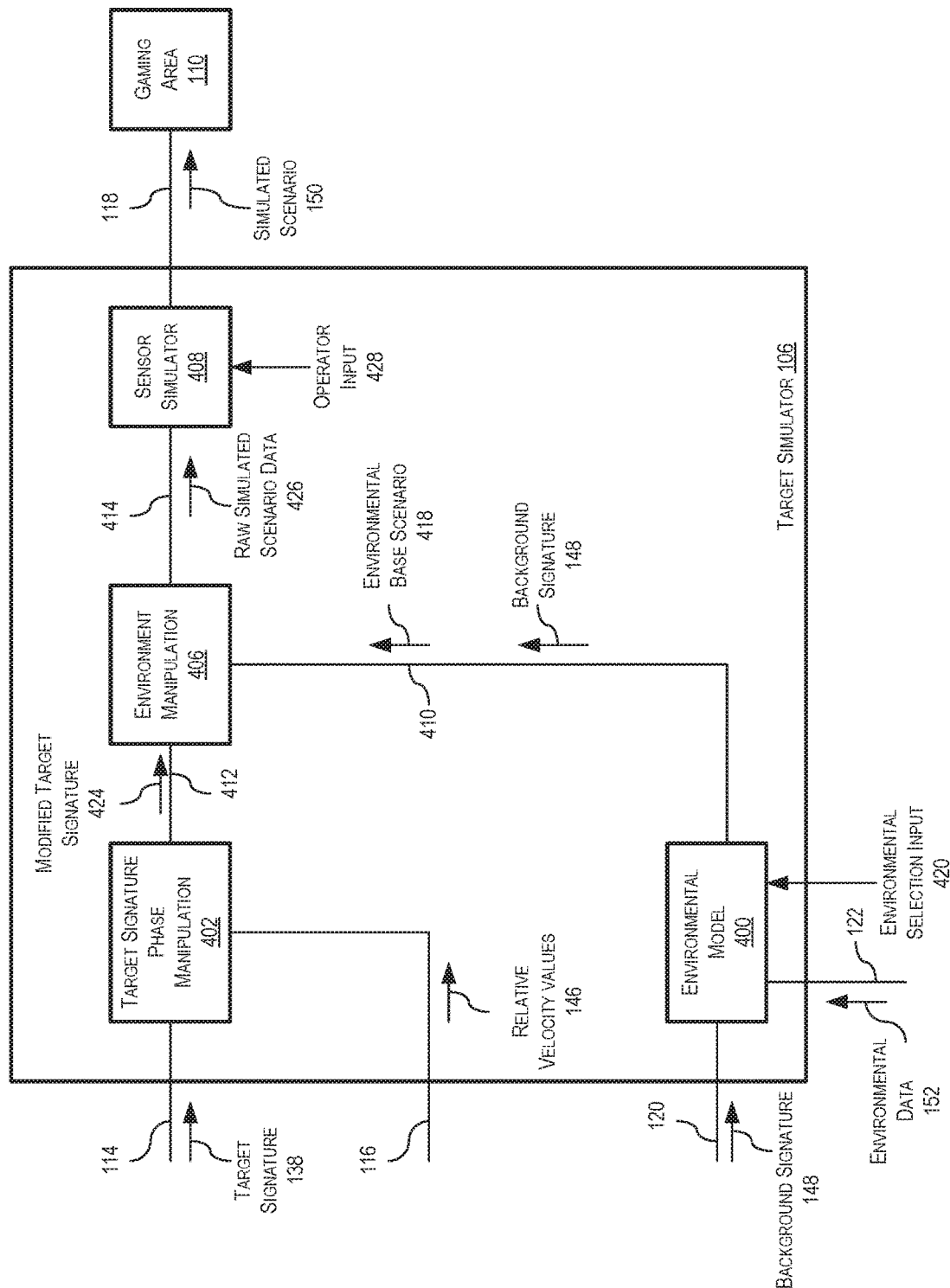
FIG. 4 is a system block diagram of an example of an implementation of the target simulator, shown in FIGS. 1 and 2, in accordance with the present disclosure.

In FIG. 4, a system block diagram of an example of an implementation of the target simulator 106 is shown in accordance with the present disclosure. The target simulator 106 may include an environmental model 400, target signature phase manipulation module 402, environmental manipulation module 406, and sensor simulator module 408. In this example, the environmental manipulation module 406 may be in signal communication with the environmental model 400, target signature phase manipulation module 402, and sensor simulator 408, via signal paths 410, 412, and 414, respectively. The target signature phase manipulation module 402 may be in signal communication with the signature extraction tool 104 and optional motion model 108 via signal paths 114 and 116, respectively. The environmental model 400 may also optionally be in signal communication with the one or more memory units 102 via signal path 122.

In this example, the environmental model 400 receives the background signature 148 from the real-world collected data database 126 (at the one or more memory units 102) and generates an environment for the simulated scenario 150 based on the background signature 148. In this example, background signature 148 from the one or more memory units 102 may be feed directly to the environmental model 400 that passes it without modification to the environment manipulation module 406. Alternatively, the environmental model 400 may modify the background signature 148 to create an environmental base scenario 418 that is feed into the environment manipulation module 406, where the environmental base scenario 418 may be generated, for example, from parameters like Wenz Curves.

The resulting environmental base scenario 418 is sent to the environment manipulation module 406 via signal path 410. For example, if the background signature 148 includes recorded background noise that was recorded in different parts of the North Atlantic Ocean, the resulting environmental base scenario 418 would include the background signature 148 recorded in one part of the North Atlantic Ocean. If the one or more memory units 102 includes additional stored information and data relating to different geographic area (such as, for example, underwater effects on sound propagation for specific seas around the world) that information (i.e., environmental data 152) may also be sent to the environmental model 400 for use in generating the environmental base scenario 418. Additionally, the environmental model 400 may be configured to receive an optional environmental selection input 420 from a trainer programming the simulated scenario 150. As an example, if the one or more memory units 102 includes additional stored information and data relating to different geographic area, the trainer may review the background signature 148 and instruct the environmental model 400 to utilize the background signature 148 from another part of the North Atlantic Ocean in generating the environmental base scenario 418. Moreover, the environmental model 400 may allow the background signature 148 to be modified so as to generate an environmental base scenario 418 from another part of the world. For example, the environmental model 400 may modify the background signature 148 that was recorded in the North Atlantic Ocean to appear as if it were recorded, instead, for example, in the Indian Ocean, South Pacific Ocean, South Atlantic, Gulf of Mexico, Mediterranean Sea, or Sea of Japan. In this example, the generated environmental base scenario 418 may be appear to have been recorded in a different geographic location than the original location where the background signature 148 was recorded. Furthermore, the environmental model 400 may modify the location of the background signature 148 in response to a selection of the trainer via the environmental selection input 420.

In this example, the relative velocity values 146 produced by the optional motion model 108 are feed into the target signature phase manipulation module 402, where the relative velocity values 146 include compression or expansion factors being on a radial velocity of the target signature 138. In general, it appreciated by those of ordinary skill in the art that for a narrowband signal, the Doppler effect is compressed based on radial velocity (alternatively the relative velocity), where for positive radial velocity, the observed frequencies seem higher than they actually are and for negative radial velocity, the observed frequencies seem lower than they are. Moreover, for broadband signals, the same principles for narrowband signals apply. Furthermore, the perceived bandwidth will also change, where for positive radial velocity, the bandwidth will shrink, and for negative radial velocities, the bandwidth will increase.

The target signature phase manipulation module 402 receives the target signature 138 (via signal path 114) from the signature extraction tool 104 and the relative velocity values 146 and modifies the target signature 138 based on the relative velocity values 146. The target signature phase manipulation module 402 then produces a modified target signature 424 that is passed to the environmental manipulation module 406 via signal path 412. In this example, the target signature phase manipulation module 402 may include components, circuitry, and or modules that are configured to filter and decimate, Doppler expand or compress, inverse beamform, and scale the target signature 138 to produce the modified target signature 424.

The environmental manipulation module 406 receives the environmental base scenario 418 and the modified target signature 424 and superimposes the modified target signature 424 on to the environmental base scenario 418. The environmental manipulation module 406 then generates raw simulated scenario data 426 that is passed to the sensor simulator 408 via signal path 414. In this example, based on the simulated position of the sensors 132 in the gaming area 110, the environmental manipulation module 406 will alter the perceived SNR of the modified target signature 424 based on the range and bearing of the target. The resulting target signature observed is added to the background signature 148 or environmental based scenario 418 (i.e., the modified background signature 148 by the environmental model 400) to produce the raw simulated scenario data 426.

The sensor simulator 408 may include a beamforming module (not shown) and narrowband processing module (not shown) that receive the raw simulated scenario data 426 and modify it based feedback from the sonar operator 312 being trained via an operator input 428. Examples of the operator input 428 may include, for example, adjustments made by the sonar operator 312 to one or more sensors 132 and/or acoustic processing as the sonar operator 312 attempts to detect the target signature 138. The sensor simulator 408 then produces the simulated scenario 150 that is passed to the gaming area 110 where the sonar operator 312 interacts with the simulated scenario 150 in a training session.

Prior to the sensor simulator 408, the background signature and target signatures may be processed by a microprocessor (not shown) that receives the raw simulated scenario data 426 and formats it for conversion by the sensor simulator 408. In general, the sensor simulator 408 converts the numerically represented physical data of the raw simulated scenario data 426 into a data having a sensor format that includes, for example, volts, counts, beamformed information that simulates whatever the actual format of the one or more of the sensors 132 that are being simulated is.

Figure 5:
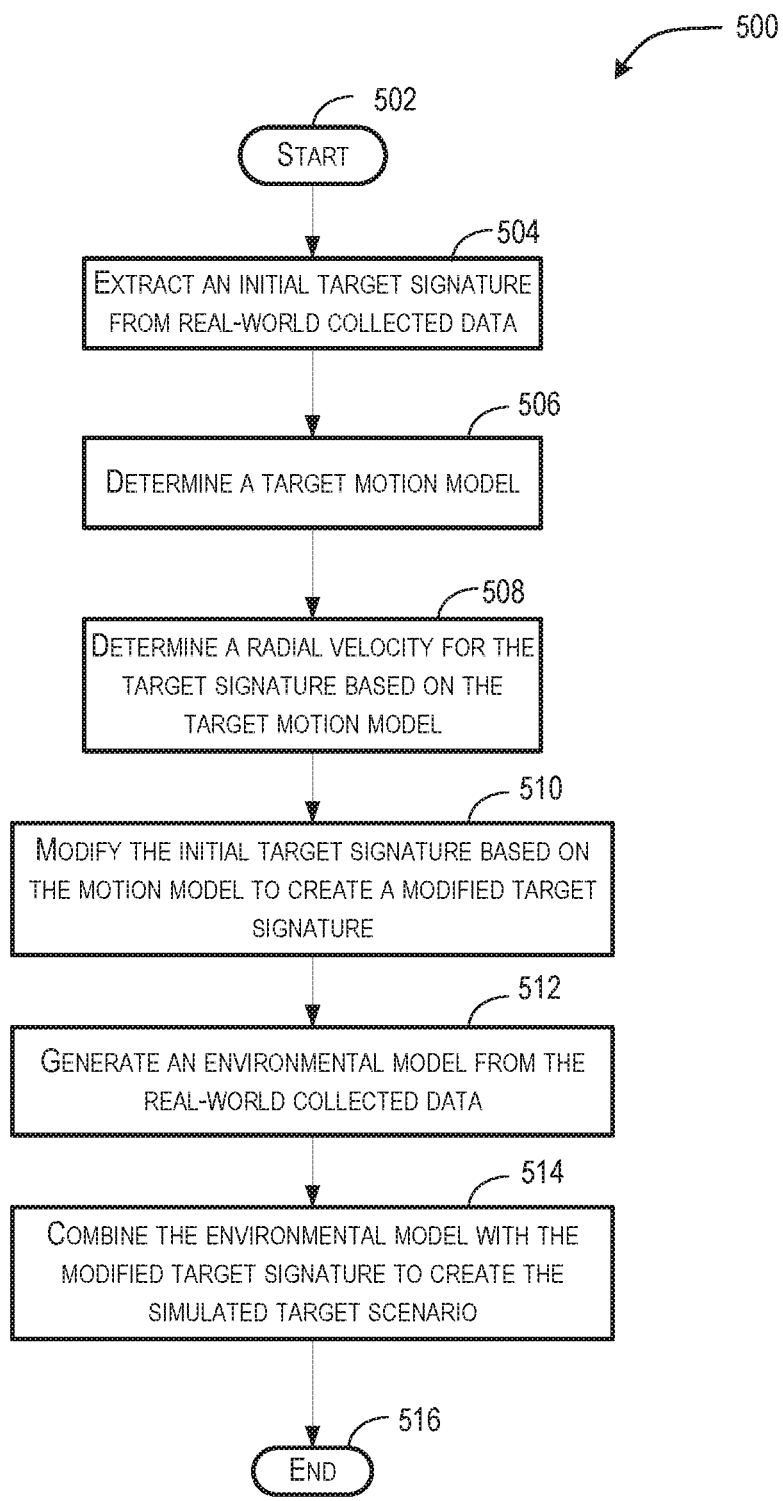
FIG. 5 is a flowchart illustrating operation of an example method for training a sonar operator with a simulated scenario within a gaming area utilizing STS, shown in FIGS. 1 through 4, in accordance with the present disclosure.

FIG. 5 is a flowchart 500 is shown illustrating operation of an example method for training the sonar operator 312 with a simulated scenario 150 within the gaming area 110 utilizing STS 100 in accordance with the present disclosure. In general, the method starts 502 by generating a target signature from real-world collected data that includes: extracting, in step 504, an initial target signature 138 from the real-world collected data 136 or a target signature data 138 from the optional target signature database 128; determining a target motion model, in step 506, for the initial target signature 138; determining, in step 508, a radial velocity for the initial target signature 138 based on the target motion model; and modifying, in step 510, the initial target signature based on the motion model to create a modified target signature 424. The process then simultaneously (or approximately simultaneously) generates, in step 512, an environmental model (i.e., the environmental based scenario 418) from the real-world collected data 136. The method then combines, in step 514, the environmental model 400 with the modified target signature 424 to create the simulated scenario 150. The method then ends 516.

It will be understood that various aspects or details of the invention may be changed without departing from the scope of the invention. It is not exhaustive and does not limit the claimed inventions to the precise form disclosed. Furthermore, the foregoing description is for the purpose of illustration only, and not for the purpose of limitation. Modifications and variations are possible in light of the above description or may be acquired from practicing the invention. The claims and their equivalents define the scope of the invention.

The flowchart and block diagrams in the different depicted example of implementations illustrate the architecture, functionality, and operation of some possible implementations of apparatuses and methods in an illustrative example. In this regard, each block in the flowchart or block diagrams may represent a module, a segment, a function, a portion of an operation or step, some combination thereof.

In some alternative implementations of an illustrative example, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different illustrative examples has been presented for purposes of illustration and description, and is not intended to be exhaustive or limited to the examples in the form disclosed. Many modifications and variations will be apparent to those of ordinary skill in the art. Further, different illustrative examples may provide different features as compared to other desirable examples. The example, or examples, selected are chosen and described in order to best explain the principles of the examples, the practical application, and to enable others of ordinary skill in the art to understand the disclosure for various examples with various modifications as are suited to the particular use contemplated.

What is claimed is:

1. A sonar target simulator ("STS") comprising:
one or more memory units configured to store real-world collected data, wherein the real-world collected data was previously recorded; and
one or more processing units, wherein the one or more processing units are configured to:
create a gaming area configured to be:
displayed on a display for use by a sonar operator, and
operable with one or more user controls;
generate a first ocean background signature from a first portion of the real-world collected data from a first ocean based on first user input;
receive second user input, wherein the second user input indicates to modify the first ocean background signature;
modify, based on the second user input, the first ocean background signature to a modified background signature corresponding to a background signature of a second ocean different than the first ocean;
receive third user input, the third user input indicating a specific target signature, an associated position, and target motion of a target, the specific target signature generated from a second portion of the real-world collected data different than the first portion of the real-world collected data with the target motion of the specific target signature different than an original target motion of the target in the second portion of the real-world collected data and comprising narrowband noise and broadband noise produced by the target;
generate relative velocity values based on the specific target signature, the associated position, and the target motion;
modify the specific target signature based on the relative velocity values to generate a modified target signature; and
generate a simulated scenario for use in the gaming area based on the modified background signature and the modified target signature.

2. The STS of claim 1 wherein the sonar operator selects location information of the specific target signature and wherein the one or more processing units is configured to display data regarding accuracy of the location information.

3. A method, comprising:
receiving first user input, the first user input indicating a first ocean background signature from a first portion of real-world collected data from a first ocean;
receiving second user input, the second user input indicating to modify the first ocean background signature to correspond to a second ocean different than the first ocean;
generating a specific target signature of a target from a second portion of the real-world collected data different than the first portion of real-world collected data with a target motion of the specific target signature different than an original target motion of the target in the second portion of the real-world collected data and comprising narrowband noise and broadband noise produced by the target;
generating an environmental model from the first portion of real-world collected data based on the second user input by modifying the first ocean background signature to a background signature for the second ocean;
generating relative velocity values associated with the target based on positional values of the target from the second portion of the real-world collected data; and
generating a simulated scenario for use in a gaming area associated with a sonar target simulator (STS) based on the specific target signature, the environmental model, and the relative velocity values.

4. The method of claim 3, wherein the target comprises a ship or a submarine.

5. The method of claim 4, wherein generating the specific target signature further comprises modifying an initial target signature with a motion model to create a modified target signature.

6. The method of claim 5, wherein modifying the initial target signature comprises manipulating the initial target signature with the relative velocity values.

7. The method of claim 6, wherein the relative velocity values are generated from a matrix of the positional values of the target and a matrix of positional values of one or more sensors associated with the STS.

8. The method of claim 3, wherein generating the specific target signature comprises receiving a target selection input from a trainer.

9. The method of claim 8, wherein the target selection input indicates a change in movement direction for the target relative to an initial movement direction of the target from the second portion of the real-world collected data.

10. The method of claim 3, wherein generating the environmental model further comprises receiving an environment selection input, and wherein the environment selection input comprises a geographic location.

11. The method of claim 10, further comprising modifying the environmental model to correspond to the geographical location responsive to the environmental model not corresponding to the geographical location.

12. A sonar target simulator ("STS"), comprising:
one or more memory units storing real-world collected data, wherein the real-world collected data comprises background signatures related to a plurality of environments of a gaming area;
one or more processing units; and
a computer-readable medium having encoded thereon computer-executable instructions to cause the one or more processing units to:
generate a first ocean background signature based on first user input, the first ocean background signature corresponding to a first portion of the real-world collected data from a first ocean;
receive second user input, wherein the second user input indicates to modify the first ocean background signature;
modify, based on the second user input, the first ocean background signature to a modified background signature corresponding to a background signature of a second ocean different than the first ocean;
receive second user input, the second user input indicating a specific target signature, an associated position, and target motion of a target, the specific target signature generated from a second portion of the real-world collected data different than the first portion of the real-world collected data with the target motion of the specific target signature different than an original target motion of the target in the second portion of the real-world collected data and comprising narrowband noise and broadband noise produced by the target;

generate relative velocity values based on the specific target signature, the associated position, and the target motion;

generate an environmental model based on the background signature, wherein the environmental model corresponds to an environment of the plurality of environments within the gaming area; and generate a simulated scenario, of the plurality of simulated scenarios, for use in the gaming area based on the specific target signature, the environmental model, and the relative velocity values.

13. The STS of claim 12, further comprising generating the specific target signature from the second portion of the real-world collected data by extracting an initial target signature from the second portion of the real-world collected data.

14. The STS of claim 13, wherein generating the specific target signature further comprises modifying the initial target signature with the relative velocity values to create a modified target signature.

15. The STS of claim 14, wherein the relative velocity values are generated from a matrix of positional values of the target and a matrix of positional values of one or more sensors.

16. The STS of claim 15, wherein the computer-executable instructions further cause the one or more processing units to generate a motion model, wherein modifying the initial target signature comprises modifying the initial target signature based on the motion model.

17. The STS of claim 14, wherein the generating the simulated scenarios comprises combining the modified target signature with the environmental model.

18. The STS of claim 12, wherein the second user input selects the specific target signature from a target signature database.

19. The STS of claim 12, wherein the target comprises a ship or a submarine.

20. The STS of claim 12, wherein generating the environmental model further comprises receiving an environment selection input.

\* \* \* \* \*